Sept. 26, 1961  C. W. VON FUMETTI  3,001,409
POWER TAKE-OFF
Filed Oct. 29, 1959

INVENTOR.
C. W. VON FUMETTI

United States Patent Office 3,001,409
Patented Sept. 26, 1961

3,001,409
POWER TAKE-OFF
Cyril W. Von Fumetti, Dubuque, Iowa, assignor to Deere & Company, Moline, Ill., a corporation of Delaware
Filed Oct. 29, 1959, Ser. No. 849,545
3 Claims. (Cl. 74—11)

This invention relates to a novel drive system finding particular utility in the power take-off drive system employed in conjunction with agricultural tractors and associated implements.

The broad idea of driving associated implements from the tractor by a power shaft driven either from the tractor engine or from the transmission is old, and its early popularity resulted in the setting up of standards relative to sizes, speeds of rotation and other characteristics. The first standards along these lines were introduced in 1923 and, among other things, established a speed of rotation of 540 r.p.m. Standardization of speed as well as of sizes, splines, locations relative to drawbars etc. enables the concomitant establishment of specifications which permit any standardized power take-off drive implement to be driven by any tractor equipped with a standardized power take-off shaft.

These standards have existed for thirty-five years but recently new standards have been introduced, involving primarily the increase of power take-off speed to 1000 r.p.m. and the use of a twenty-one-tooth involute-shaped spline in place of the old six-straight-sided spline, plus variations in the location of the shaft relative to hitch points etc. Although the new standards introduce many and significant advantages, they are not without certain disadvantages, primarily important among which is the requirement that either old implements be adapted to the new standards, especially as to speeds, or the new tractors be equipped with conversion mechanism for reducing the 1000 r.p.m. speed to the 540 r.p.m. speed for use with old implements. Likewise, it is desirable to provide conversion mechanism for increasing the old 540 r.p.m. speed for use with new implements. Further, the changes in the spline for the new standardized shaft means that this spline will not fit couplings built according to the old standards.

The present invention is concerned primarily with the provision of ratio-changing mechanism, provided particularly as an attachment, for use with tractors having power take-off shafts, and the mechanism is arranged so that it is capable of converting either power shaft speed to the higher or lower speed, as the case may be. Accordingly, the invention aims at the provision of an improved conversion transmission, adaptable to the power take-off system, for making the necessary conversion, as from 1000 r.p.m. to 540 r.p.m. or vice versa. It is a principal object of the invention to provide such transmission in the form of a housing-contained gearing which is so constructed as to be capable of inversion or reversibility to readily adapt itself to either of the two basic conditions that will be encountered. Other objects of the invention reside in improved means for mounting and dismounting the conversion mechanism and for facilitating the interchange of different types of power shafts.

The foregoing and other important objects and desirable features inherent in and encompassed by the invention will become apparent as a preferred embodiment of the invention is disclosed in detail, by way of example, in the ensuing description and accompanying sheet of drawings, the several figures of which are described immediately below.

For the purpose of present illustration, the numeral 10 designates the rear portion of a tractor or other vehicle, it being noted in this respect that such expressions as "front," "rear" etc. are used as terms of convenience and not of limitation. In the typical agricultural tractor, the power take-off shaft projects from the rear and accordingly the present description will proceed on that basis.

The structure shown includes an additional support 12 in the form of a cylindrical casting or forging from the rear end of which a power take-off shaft 14 projects. This particular shaft is representative of the 1000 r.p.m. shaft and therefore is formed with twenty-one external splines. As is well known, this shaft may be directly engine-driven or transmission-driven, the details of which are not disclosed here, because they are assumed to be familiar to those versed in the art. In the ordinary case of a tractor so equipped, specially designed implements, adapted to be driven at speeds compatible with the 1000 r.p.m. speed of the shaft 14, will be used with the tractor.

Figure 1:
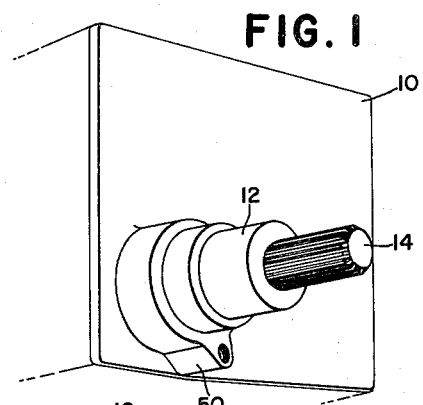
FIG. 1 is a fragmentary perspective view of the rear portion of a tractor or similar vehicle having an outwardly projecting power shaft.
Figure 2:
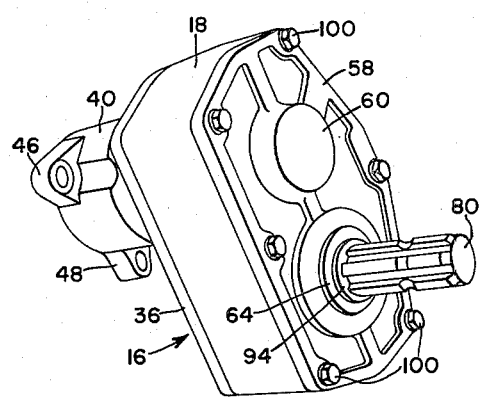
FIG. 2 is a perspective view of the conversion mechanism in one phase of its adaptability.
Figure 4:
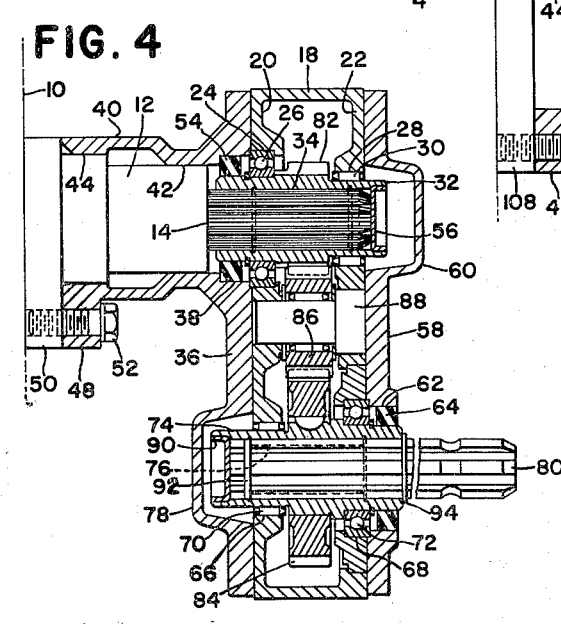
FIG. 4 is an enlarged section on the line 4—4 of FIG. 3.

In those cases in which the implements are of the older type and are designed to be operated at 540 r.p.m., the conversion mechanism of FIG. 2, indicated in its entirety by the numeral 16, can be used. This mechanism comprises basically a housing 18 having front and rear walls 20 and 22, respectively (FIG. 4). In this respect, it should be observed that, as will be brought out later, the housing 18 is reversible from front to rear, and accordingly the positions of the walls 20 and 22 will change. However, for present purposes, the reversibility may be temporarily ignored.

Figure 3:
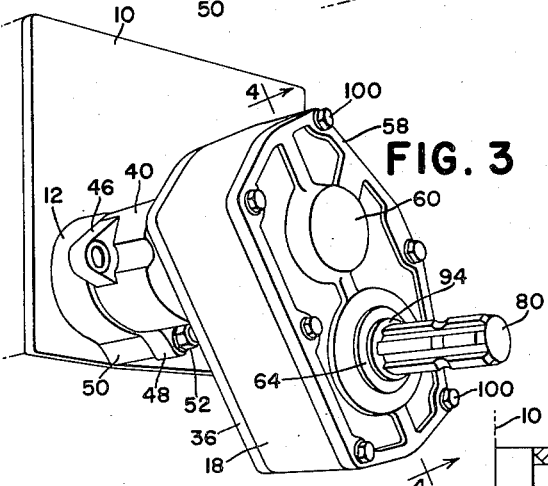
FIG. 3 shows the structure of FIG. 2 mounted on the structure of FIG. 1.

The front wall 20 has an upper circular aperture 24 which carries a front anti-friction bearing 26. The rear wall 22 is apertured in alignment at 28 and carries a rear anti-friction bearing 30. These two bearings journal a tubular shaft 32 which is internally splined at 34 with twenty-one splines matching those on the tractor power shaft 14. Hence, the tubular shaft 32 is capable of coaxially receiving the shaft 14 when the conversion unit 16 is mounted on the tractor. For this purpose, the front wall of the housing carries a removable cover 36 which is apertured at 38 in alinement with the front wall aperture 24 for the purpose of permitting rearward access to the front or shaft-receiving end of the tubular shaft 32. In addition, the cover 36 includes a forward adapter or mounting element 40 in the form of a sleeve which telescopically receives the cylindrical support element 12 on the tractor. The interior of the sleeve may be provided with internal annular supporting portions 42 and 44 cooperative respectively with cylindrical portions on the element 12, all as depicted in FIG. 4. The external portion of the adapter or mounting sleeve 40 carries a pair of angularly spaced apart mounting portions in the form of apertured lugs 46 and 48. The support element 12 has thereon an apertured tapped lug 50, and the unit 16 may be arranged with either of the housing lugs 46 or 48 in register with the tractor lug 50. In the present case, registration is shown as occurring between the lugs 48 and 50, and releasable securing means, such as a cap screw 52, is used to mount the housing. If the lug 46 is used, the angular position of the housing relative to the tractor will be changed. This flexibility is desired for the purpose of varying the relationship of the ultimate power take-off shaft to the tractor drawbar (not shown). Also, the adapter or conversion housing 16 is thus enabled to fit tractors of several styles or types. When the housing is mounted as shown in FIGS. 3 and 4, the opening 38 in the cover 36 surrounds the forward end of the tubular shaft 32, and an appropriate seal is used at 54 for recognized purposes. The rear end of the tubular shaft 32 is capped or plugged by a removable plug 56. The housing has a rear cover 58 which is shaped at 60 to receive and enclose the rear end of the shaft 32 and which further has in offset relation to the enlarged part 60 a rearwardly opening aperture 62 which is provided with a conventional lubricant and dirt seal 64.

The front and rear walls 20 and 22 of the housing are provided respectively with a pair of coaxial openings 66 and 68, which are additionally coaxial with the opening 62 in the rear cover 58. The openings 66 and 68 respectively carry front and rear anti-friction bearings 70 and 72 for the purpose of journaling a second or lower tubular shaft 74 which is internally splined by the provision of six straight-sided splines at 76. In the arrangement shown in FIG. 4, the front end of the shaft 74 is enclosed by an enlarged portion 78 on the lower part of the front cover 36, but the rear or shaft-receiving end of the shaft 74 projects through and is sealed by the lubricant and dirt seal 64. Consequently, the rear end of the shaft 74 opens rearwardly. This is for the purpose of receiving the ultimate power shaft, such as that shown at 80, which shaft, of course, is provided with six external splines matching the internal splines at 76 in the shaft 74, whereby the shaft 80 is forwardly coaxially receivable by the tubular shaft 74. Thus, the conversion unit 16 in this case has an input of 1000 r.p.m. as represented by the twenty-one-tooth splined shaft 14 and an output as represented by the six-tooth splined shaft 80. In order that the speed of the shaft 80 may be reduced to 540 r.p.m., the drive mechanism includes internal gearing having the necessary reduction ratio. This gearing comprises a small gear 82 preferably formed integral with the tubular shaft 32, a larger gear 84 keyed to the shaft 74, and an idler gear 86 journaled on an internal stub shaft 88.

Figure 6:
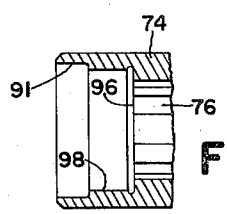
FIG. 6 is an enlarged fragmentary view showing the end portion of one of the internally splined shafts.

In the assembly shown in FIG. 4, the forward end of the shaft 74 is plugged by a removable internal cap 90, received in an annular recess 91 in the shaft (FIG. 6). The shaft 80 is retained in place by front and rear snap rings 92 and 94, received respectively in grooves provided in the shaft for that purpose. The rear snap ring 94 is external and abuts the rear end of the shaft 74. The front snap ring 92 is received by or abuts an annular shoulder 96 (FIG. 6) afforded by the junction between the internal splines 76 and a coaxial unsplined portion 98 of the shaft 74.

In the use of the conversion unit 16 in the manner described, adequate support is provided at 12 and the single cap screw 52 is found to be sufficient to hold the housing against torque reaction thereon. The arrangement is such that a tractor having a power take-off shaft speed of 1000 r.p.m. is readily converted to one having a power take-off shaft speed of 540 r.p.m.

The housing 18 is symmetrical from front to rear when inverted, and the covers 36 and 58 are similarly designed, for purposes to presently appear. The removability of the covers is established by the use of a plurality of removable fasteners, such as cap screws 100, which are the same for both covers. The purpose of the reversibility and inversion of the unit is so that it can be adapted to convert a low-speed power take-off to a high-speed power take-off. This amounts to substantially a reversal of the arrangement just described; that is, a tractor equipped with a power take-off of 540 r.p.m. may be converted to a power take-off of 1000 r.p.m. This is shown in FIG. 5.

When it is desired to reverse and invert the unit 16, the unit is first removed from its position on the tractor as previously described. That is, the cap screw 52 is removed and the unit is slid rearwardly off of the supporting element 12, at the same time causing withdrawal of the 1000 r.p.m. power take-off shaft 14 from the hollow internally splined shaft 32. The unit can then be made ready for mounting on a tractor having a power shaft rotating at 540 r.p.m. and splined with six straight-sided splines, representative of which is the power shaft shown at 102 in FIG. 5. Reversal of the housing and inversion thereof is accomplished first by removing the covers 36 and 58 via removal of the respective cap screws 100. The snap ring 94 is removed from its groove in the output shaft 80, and the shaft 80 is tapped in the direction of the removable plug 90, which forces this plug out so that the shaft can be withdrawn from the hollow shaft or gear hub 74. With the covers 36 and 58 removed, the housing 18 is inverted and reversed by changing its position so that the rear wall becomes the front wall and vice versa and the previously lowermost shaft 74 becomes the upper shaft. This will of course mean that the previously upper shaft 32 now becomes the lower shaft. In this condition, the plug 90 is replaced in the same end of the shaft 74 that it previously occupied, except now this end of the shaft will be to the rear.

Figure 5:
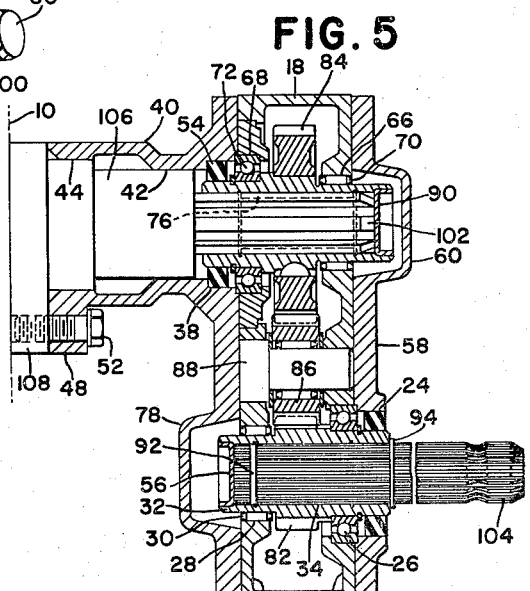
FIG. 5 is a section similar to that shown in FIG. 4 but showing the reversal or inversion of the housing.

A new adapter shaft 104, which is externally splined with twenty-one splines is, without snap rings, inserted through the open end of the shaft 32 which represents the rear end in FIG. 5. The shaft is tapped lightly so as to dislodge the cap 56. At this point, it should be observed that the structure of the shaft 32 is similar to that of the shaft 74, and it will have the same details as shown in FIG. 6. That is, it will have a recess for receiving the cap 56 and it will further have a shoulder formed by the junction between the splines 34 and an adjacent unsplined portion similar to that at 98. In view of the complexity of the shaft 104 caused by the necessity of showing the several splines thereon, illustration of these components in dotted lines and designation thereof by reference characters would detract from the clarity of the illustration. Therefore, it is deemed sufficient to refer to this structure as similar to that shown in FIG. 6.

Since the shaft 104 is now capable of endwise movement completely through the shaft 32, the snap ring 92 can be installed and the shaft can be pushed rearwardly so as to receive the snap ring 94, whereupon it will be confined against axial displacement relative to the tubular shaft 32. The plug 56 can be then replaced. The two covers 36 and 58, being symmetrical, can then be secured respectively to the walls 22 and 20 which, as has been explained, are reversed. That is, the former front wall 20 is now the rear wall and vice versa. However, the front and rear covers occupy the same respective positions that they did in FIGS. 2, 3 and 4. The inverted and reversed unit can now be mounted on a tractor having the 540 r.p.m. power shaft 102 projecting from a cylindrical support element 106 that is similar to that previously described at 12. The 540 r.p.m. shaft 102 will be rearwardly received through the now open front end of the tubular shaft 74, in the rear end of which the plug or cap 90 has already been installed before assembly of the rear cover 58. The support 106 will have thereon a lug 108 similar to that previously described at 50, which receives the cap screw 52 for mounting the unit thereon in the same manner as that previously described. In this case, the twenty-one splined shaft 104 will be the ultimate output shaft. The reduction gearing 82—84—86 will now be reversed so that the large gear 84 will be driven by the 540 r.p.m. shaft 102 and the small gear 82 will drive the ultimate output shaft 104 at 1000 r.p.m., which is just the reverse of the reduction described above in connection with FIGS. 3 and 4.

As will be seen, the unit has desired flexibility in enabling its adaptation to tractors having power shafts of either of the two basic or standard speeds noted, in either case producing a different standardized speed. For example, the 540 r.p.m. output of the tractor can be converted to an ultimate 1000 r.p.m. output and vice versa. The symmetry of the housing enables the reversibility or inversion thereof which, together with the symmetry of the covers 36 and 58, completes the facility just noted, thus affording a relatively low-cost unit for accomplishing the purposes set forth.

Features and advantages other than those categorically enumerated will readily occur to those versed in the art, as will many modifications and alterations in the preferred embodiment of the invention disclosed, all of which may be achieved without departure from the spirit and scope of the invention.

What is claimed is:

1. For use in the power take-off system of a tractor and associated implement including a fore-and-aft power take-off shaft provided with external splines and a rearwardly offset fore-and-aft driven shaft at a lower elevation and having external splines different from those of the power take-off shaft: a drive attachment for disposition between the shafts, comprising a housing having generally upright front and rear walls, a top and a bottom, each wall having upper and lower openings respectively coaxial with the power take-off and driven shafts; bearings respectively in the openings; upper hollow shaft means journaled in the bearings in the upper openings and having front and rear ends and internally splined to match and to telescope forwardly onto the power take-off shaft; lower hollow shaft means journaled in the bearings in the lower openings and having front and rear ends and internally splined to match and to axially forwardly receive the driven shaft; drive mechanism within the casing for causing rotation of the upper and lower shaft means in the same direction but at different speeds and including upper and lower gears of different sizes respectively fixed to said upper and lower shaft means; front and rear covers removably secured respectively to the front and rear walls, said front cover having an upper opening to expose the front end of the upper shaft means and a lower closure for the front end of the lower shaft means, and the rear cover having an upper closure for the rear end of the upper shaft means and a lower opening to expose the rear end of the lower shaft means; and said housing being symmetrical at opposite sides of a transverse median plane extending from the lower front to the upper rear thereof so that said housing, with the covers removed and the shaft means disconnected from the power take-off and driven shafts, is reversible from front to rear as well as from top to bottom whereby the upper shaft means becomes lowermost and has its front end to the rear and coaxial with the originally positioned rear cover lower opening and the lower shaft means becomes uppermost and has its rear end to the front and coaxial with the originally positioned front cover upper opening.

2. For use in the power take-off system of a tractor and associated implement including a fore-and-aft power take-off shaft provided with external splines and a rearwardly offset fore-and-aft driven shaft at a lower elevation and having external splines different from those of the power take-off shaft: a drive attachment for disposition between the shafts, comprising a housing having generally upright front and rear walls, a top and a bottom, each wall having upper and lower openings respectively coaxial with the power take-off and driven shafts; bearings respectively in the openings; upper hollow shaft means journaled in the bearings in the upper openings and having front and rear ends and internally splined to match and to telescope forwardly onto the power take-off shaft; lower hollow shaft means journaled in the bearings in the lower openings and having front and rear ends and internally splined to match and to axially forwardly receive the driven shaft; drive mechanism within the casing for causing rotation of the upper and lower shaft means in the same direction but at different speeds and including upper and lower gears of different sizes respectively fixed to said upper and lower shaft means; and said housing being symmetrical at opposite sides of a transverse median plane extending from the lower front to the upper rear thereof so that said housing, with the shaft means disconnected from the power take-off and driven shafts, is reversible from front to rear as well as from top to bottom whereby the upper shaft means becomes lowermost and has its front end to the rear and coaxial with the driven shaft and the lower shaft means becomes uppermost and has its rear end to the front and coaxial with the power take-off shaft.

3. For use in the power take-off system of a tractor and associated implement: a drive attachment, comprising a housing having generally upright front and rear walls, a top and a bottom, said walls respectively having upper and lower openings respectively coaxial on upper and lower fore-and-aft axes; bearings respectively in the openings; upper, hollow, internally splined shaft means journaled in the bearings in the upper openings and having front and rear ends; lower, hollow, differently internally splined shaft means journaled in the bearings in the lower openings and having front and rear ends; drive mechanism within the casing for causing rotation of the upper and lower shaft means in the same direction but at different speeds and including upper and lower gears of different sizes respectively fixed to said upper and lower shaft means; front and rear covers removably secured respectively to the front and rear walls, said front cover having an upper opening to expose the front end of the upper shaft means and a lower closure for the front end of the lower shaft means, and the rear cover having an upper closure for the rear end of the upper shaft means and a lower opening to expose the rear end of the lower shaft means; and said housing being symmetrical at opposite sides of a transverse median plane extending from the lower front to the upper rear thereof so that said housing, with the covers removed, is reversible from front to rear as well as from top to bottom whereby the upper shaft means becomes lowermost and has its front end to the rear and coaxial with the originally positioned rear cover lower opening and the lower shaft means becomes uppermost and has its rear end to the front and coaxial with the originally positioned front cover upper opening.

References Cited in the file of this patent

UNITED STATES PATENTS

| | | |
|---|---|---|
| 1,794,496 | Ramsey | Mar. 3, 1931 |
| 1,874,261 | Evelyn | Aug. 30, 1932 |
| 2,192,146 | Nightenhelser | Feb. 27, 1940 |
| 2,618,980 | Cook et al. | Nov. 25, 1952 |
| 2,624,416 | Larsen | Jan. 6, 1953 |
| 2,645,944 | Crichton et al. | July 21, 1953 |
| 2,851,896 | Ordway | Sept. 16, 1958 |